United States Patent [19]

Fowler et al.

[11] Patent Number: 5,170,566
[45] Date of Patent: Dec. 15, 1992

[54] MEANS FOR REDUCING INTERFERENCE AMONG MAGNETOMETER ARRAY ELEMENTS

[75] Inventors: J. Thomas Fowler; George E. Selecman, both of Marblehead, Mass.

[73] Assignee: Arthur D. Little, Inc., Cambridge, Mass.

[21] Appl. No.: 533,571

[22] Filed: Jun. 5, 1990

[51] Int. Cl.⁵ .............................................. G01C 17/38
[52] U.S. Cl. ........................................ 33/356; 33/361
[58] Field of Search .................. 33/361, 362, 304, 301, 33/312, 313, 316, 318, 319, 321, 329, 363 R, 363 Q, 356, 357

[56] References Cited

U.S. PATENT DOCUMENTS

| | | | |
|---|---|---|---|
| 2,852,859 | 9/1958 | Depp | 33/319 |
| 3,744,312 | 7/1973 | Anderson | 33/356 X |
| 3,746,842 | 7/1973 | Fowler . | |
| 3,927,474 | 12/1975 | Lapeyre et al. . | |
| 4,038,528 | 7/1977 | Fowler . | |
| 4,503,621 | 3/1985 | Fowler . | |
| 4,539,760 | 9/1985 | Marchent | 33/361 X |
| 4,725,995 | 2/1988 | Fowler . | |
| 4,843,865 | 7/1989 | Fowler . | |
| 4,912,684 | 3/1927 | Fowler . | |

Primary Examiner—Harry N. Haroian
Attorney, Agent, or Firm—Schiller & Kusmer

[57] ABSTRACT

An improved fluxgate instrument for measuring heading as well and pitch and roll angles is disclosed. A plurality of fluxgate sensors are continuously energized with a DC feedback signal derived from the reading of each sensor so as to minimize magnetic cross-coupling between the sensors. In addition while two sensors are gimbally mounted to sense the horizontal components of the earth's magnetic field, the vertical field is sensed by two sensors strapped down relative to the instrument casing for sensing the earth's vertical magnetic field in order to compensate for latitude. Finally, sine and cosine coils surround the gimbally mounted sensors and generate AC fields which are sensed by the gimbally mounted sensors and are used to calculate the pitch and roll angles.

12 Claims, 3 Drawing Sheets

MEANS FOR REDUCING INTERFERENCE AMONG MAGNETOMETER ARRAY ELEMENTS

The present invention generally relates to compasses and magnetometers, and more particularly to improved three-axis fluxgate compasses and magnetometers adapted to provide heading readings corrected for both attitude and latitude, and accurate roll and pitch angle measurements.

Digital compasses used for measuring magnetic heading and generating a signal indicative of heading to a remote site are well known. See, for example, U.S. Pat. No. 3,746,842. Such magnetic compasses have been designed to include attitude correction by mounting the magnet in a gimbal, separate from a compass card. See, for example, U.S. Pat. No. 3,927,474. More accurate compasses are employed for generating signals representative of heading as a part of an automatic navigation system for ships. See, for example, U.S. Pat. No. 4,038,528.

During the 1980s, with the development of heading sensors for seismic applications, the need arose for relatively small and accurate heading sensors connected together as a towed array as part of a seismic streamer. See, for example, U.S. Pat. No. 4,725,995 and 4,912,684. This application created the need for smaller and more accurate sensors for detecting the earth's magnetic field as an indication of heading.

One particular type of device which has been developed for accurately measuring heading direction, and is particularly useful for such seismic applications because of its relatively small size, is the fluxgate compass. The latter typically includes two sensors having their sensing axes orthogonally disposed with respect to one another (referred to as the X and Y sensors defining the X and Y sensing axes). The sensors are mounted on a platform secured within a gimbal so as to maintain the two sensors axes in a horizontal orientation so that the sensors detect the two horizontal field components $H_x$ and $H_y$ of the earth's field. The platform is weighted with counter weights so that gravity is used to maintain the horizontal orientation of the platform relative to the center of the earth.

Gimbaled magnetometers have also been developed not only for measuring the direction of heading, but also the amplitudes of the horizontal components. Typically, both the $H_x$ and $H_y$ field components are measured and the actual angle of the heading, HEADING, is ascertained by computing, or resolving the angles from the measured magnetic vectors as a function of:

$$\text{HEADING} = \arctan(H_y/H_x). \quad (1)$$

For a two-axis magnetometer see, for example, U.S. Pat. No. 4,503,621 (Fowler). The two magnetometer sensors, mounted on a gimbaled support so that they remain in the horizontal plane, are an open loop design, using a novel frequency scheme to digitize the magnetic vectors. Correction coefficients are stored in an onboard EEPROM to linearize the magnetic vector data, resulting in an accuracy of about 1.0 degrees RMS. However, under certain conditions such as measurements at high latitude extremes, the horizontal field components $H_x$ and $H_y$ are not perfectly orthogonal to the vertical field component, $H_z$. There is no attempt to compensate the unit for these latitude variations.

A more sophisticated heading sensor employs closed loop current feedback to two magnetometer sensors gimbaled on a common platform. These have proven to be about 0.2 degrees RMS at the latitude of Massachusetts. These designs, however, also exhibit significant variation in accuracy at radically different magnetic latitudes.

Accordingly, since the earth's vertical magnetic field component is a function of geographic latitude, accurate compasses and magnetometers have been developed for generating signals representative of latitude as well as heading, by not only sensing the horizontal field components, but also the vertical field component. These latter type devices typically comprise three sensors having their sensing axes orthogonally disposed relative to one another and mounted on a platform secured within a gimbal arrangement. As in the two-axis fluxgate devices, in three-axis devices the platform supporting the three sensors is weighted with counter weights so that gravity is used to maintain the horizontal orientation of the platform relative to the center of the earth. Two of the sensors, the X and Y sensors, are mounted so that their sensing axes are normal to one another in the horizontal plane of the platform. The third sensor, the Z sensor, is mounted so that its axis is normal to the plane of the platform and therefore directed through the center of the earth (and therefore defines the Z axis).

The X and Y sensors produce signals as a function of the corresponding two horizontal magnetic field components $H_x$ and $H_y$, while the Z sensor produces signals as a function of the vertical magnetic field component $H_z$. See, U.S. Pat. No. 4,843,865 (Fowler), the '865 Patent, which discloses a three axis fluxgate compass. The three sensors are not only useful in generating signals representative of heading and latitude, but also can be used to provide information relating to pitch and roll, i.e. the extent to which the casing of the instrument is not exactly oriented in the horizontal plane. Specifically, correlations between the $H_z$ component and the horizontal components $H_x$ and $H_y$ can be predetermined and the device calibrated before being used in the field, as suggested by the '865 Patent.

Suggestions have been made to eliminate all moving parts by using tri-axially oriented magnetometers, fixed within a common casing, to measure the magnetic field vectors in three orthogonal directions, and three accelerometers or pitch and roll sensors, similarly mounted to measure pitch and roll. Such a device has the advantage of eliminating moving parts. However, attempts to provide an accurate or reliable instrument have failed, primarily as a result of accelerometer limitations.

An additional problem of the three-axis fluxgate instrument is that slight misalignment tolerances are inevitable in manufacturing and installing the fluxgate sensors. Generating the pitch and roll angles from the three axis measurement therefore is inaccurate to the extent that errors are created due to any misalignment.

Further, as described above, the magnetometer sensors are placed in close proximity to each other as is necessitated by relatively small overall dimensions of the instrument. As a result they can magnetically interfere with each other. More specifically, each sensor contains a saturable magnetic core element, which when exposed to external fields creates a magnetic dipole. Thus, the magnetic dipole, formed by the magnetic material, can cause field distortion and soft iron errors. This problem becomes especially severe when these elements are close together but asymmetrically arranged, as is the case of separately gimbaled elements in a fore and aft arrangement. Thus, the Y and Z sensors create magnetic dipoles for the X sensor, the X and Z sensors create magnetic dipoles for the Y sensor, and the X and Y sensors create magnetic dipoles for the Z sensor.

Accordingly, it is an object of the present invention to reduce or substantially overcome the above-noted problems of the prior art.

Another, more specific object of the present invention is to provide an improved three axis instrument for measuring the earth,s magnetic field which provides more accurate heading information compensating for both latitude and attitude errors.

And another object of the present invention is to provide an improved three axis instrument for measuring the earth's magnetic field and adapted to provide pitch and roll information for 360° of pitch and roll independent of any mechanical movement, such as motion associated with gimbal bearings, and the inherent problem of stiction.

Yet another object of the present invention is to provide an improved three axis magnetometer instrument adapted to compensate for the magnetic cross coupling created by the sensor elements.

These and other objects are achieved by an improved three axis apparatus for sensing the earth's magnetic field. The apparatus is improved by providing means for substantially cancelling any magnetic cross coupling among the sensors, means for providing correction for latitude and attitude errors, and means for providing accurate measurement of pitch and roll independent of any errors introduced by mechanical stiction in the gimbal bearings supporting at least some of the magnetic field sensors of the instrument.

Other objects of the invention will in part be obvious and will in part appear hereinafter. The invention accordingly comprises the apparatus possessing the construction, combination of elements, and arrangement of parts exemplified in the following detailed disclosure, and the scope of the application of which will be indicated in the claims.

For a fuller understanding of the nature and objects of the present invention, reference should be had to the following detailed description taken in connection with the accompanying drawings wherein.

Referring to the drawings the same numerals are used to identify the same parts.

Figure 1:
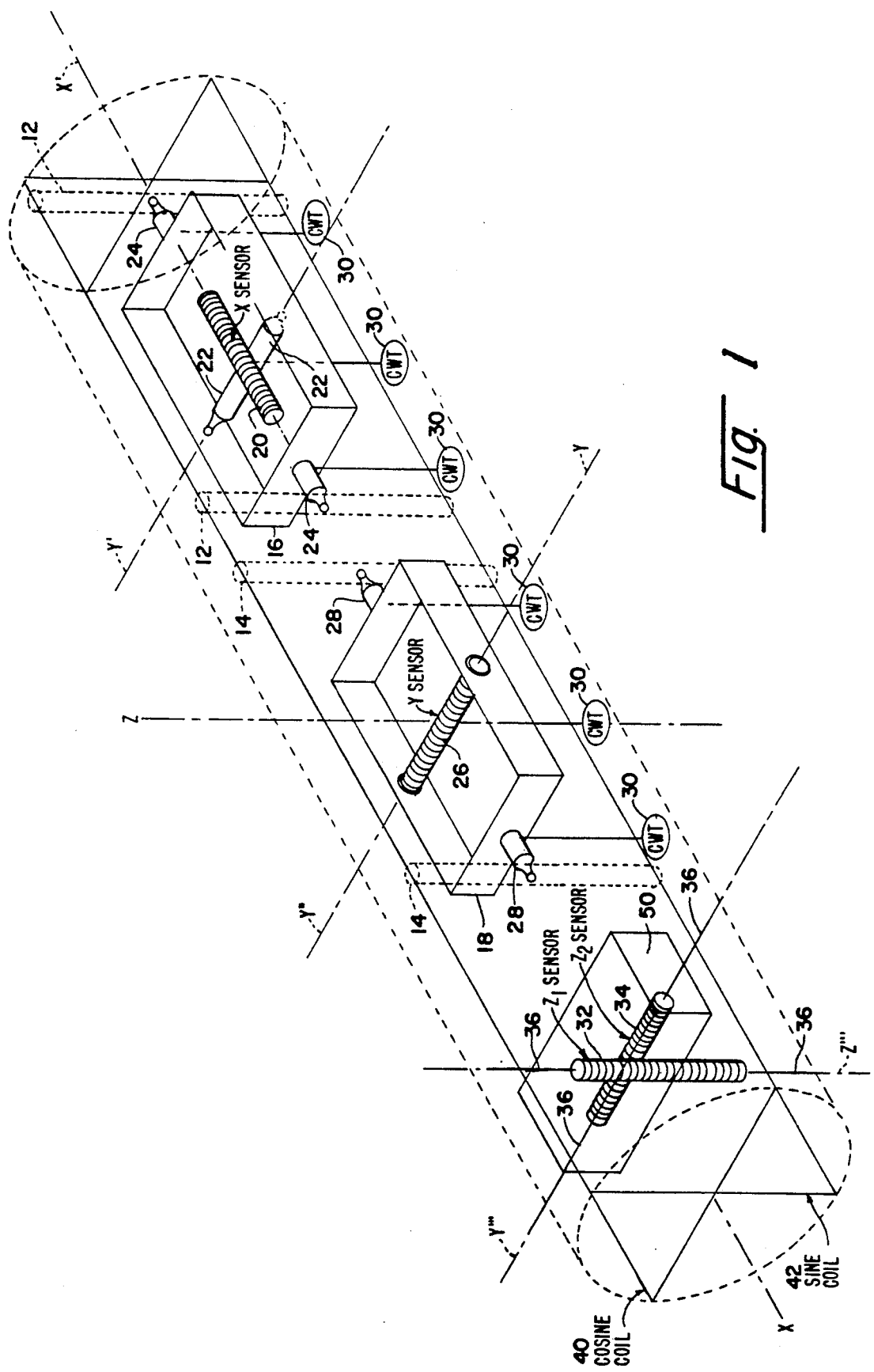
FIG. 1 is a schematic view, in perspective of the three-axis sensor instrument of the present invention.

As shown in FIG. 1, the apparatus of the present invention includes a casing, indicated by dotted lines 10, for housing the component parts within a hermetically sealed environment. The casing 10 is preferably cylindrical in shape and includes an end cap (not shown) which can be removed and the component parts inserted into the casing. The casing may, for example, be the cartridge retention system shown in U.S. Pat. No. 4,725,995, although other casing constructions can be used. The casing is made of a material which has non-magnetic properties, such as a hard plastic, e.g., polycarbonate, so that magnetic flux easily passes through the casing without interference from the casing material.

A suitable frame (not shown) is adapted to slide into the casing and support the various elements of the apparatus within a three-axis Cartesian coordinate system defined by an X-axis disposed coaxially with the longitudinal axis of the casing, the Y-axis disposed radially across the casing perpendicular to the X-axis, and the Z-axis also disposed radially across the casing normal to the X- and Y-axes. The frame is adapted to slide into the outer casing housing in a tight and fixed position relative to the X-, Y- and Z-axes so that the frame is fixed within the casing. The frame includes a first pair of stanchions 12 for supporting a first gimbaled platform 16 along the X-axis, and a second pair of stanchions 14 for supporting a second gimbaled platform 18 also along the X-axis.

More specifically, the platform 16 includes the X sensor 20 for sensing the horizontal field component $H_x$, along the sensing axis X' (the longitudinal axis of the coil sensor), which for zero pitch and roll is coaxial with the X-axis. The sensor 20 is fixed to a first pair of gimbal bearings 22 supported by the platform 16 so that the sensor freely pivots about an axis Y', parallel to the Y-axis. The platform 16 is in turn secured to the gimbal bearings 24, which in turn is supported by the stanchions 12, so that the platform 16 and the sensor 20 freely pivot about the X-axis of the casing.

The platform 18 includes the Y sensor 26 for sensing the horizontal field component $H_y$, along the sensing axis Y" (the longitudinal axis of the coil sensor), which for zero pitch and roll is coaxial with the Y-axis. The sensor 26 is fixed to the platform 18 so that the sensing axis is perpendicular to the X-axis. The platform 18 is supported by gimbal bearings 28, which in turn are supported by the stanchions 14 so that the platform 18 and sensor 26 freely pivot about the X-axis.

Counterweights 30 are provided for the platforms 16 and 18 so as to maintain the platforms level, and normal to the gravity vector.

A separate pair of sensors 32 and 34, identified as the $Z_1$ and $Z_2$ sensors, respectively, are fixed to the frame (and therefore are referred to as "strapped down" sensors) as indicated by the dotted lines 36 so that the $Z_1$ sensor 32 is disposed with its longitudinal sensing axis Z''' parallel to the Z-axis of the casing, and the $Z_2$ sensor 34 is disposed with its longitudinal sensing axis Y'''' parallel to the Y-axis of the casing.

The sensors 20, 26, 30 and 32, are preferably high accuracy magnetometers. Fluxgate magnetometers are coils with one or more windings containing saturable magnetic material that can be used to measure magnetic fields over wide dynamic ranges. Although shown in FIG. 1, as a solenoid type sensor with a single coil wrapped around a single rod of magnetic saturable material, other types of sensors could be used such as single core, Vacquier, Forster, and Aschenbrenner and Goubau sensors. As will be appreciated hereinafter, prior efforts have been made to try to keep the excitation field separate from the output signal of the sensor by providing multiple windings within a single sensor. However, in the present invention it has been found preferable to use a single coil, single core sensor (a solenoid type sensor) since it has the advantage of being a two terminal device, and when employed in a gimbaled bearing, it is suspended in the horizontal plane between two conductive bearings, permitting 360° of rotational freedom. With the improved detection scheme described below, cancellation of the primary excitation proves unnecessary and the single coil approach performs equally as well in attitude sensor applications as any of the multiple winding types.

Means are also provided for measuring the pitch and roll angle of the casing relative to the earth's fields. Preferably, the means for measuring pitch and roll include excitation coils 40 and 42 also fixed to the frame. One of the coils, coil 40, preferably is disposed in the X-Y plane formed by the X- and Y-axes and is hereinafter referred to as the "cosine coil". The other coil, coil 42, is preferably disposed in the X-Z plane formed by the X- and Z-axes and is hereinafter referred to as the "sine coil". The plane of the sine and cosine coils therefore intersect along the X-axis.

The instrument also includes a suitable circuit board 50 fixedly supported within the casing 10. As described in U.S. Pat. No. 4,503,621, the gimbal bearings can be made of an electrically conductive material and electrical signals transmitted between the board and the X- and Y- sensors can be transmitted through the gimbaled bearings. Suitable wires (not shown) can be provided to carry signals between the gimbal bearings and the circuit 50, and between the gimbal bearings and the sensors. Additional wires (not shown) connect the circuit 50 to each sensor 32 and 34 and the coils 40 and 42.

Figure 2:
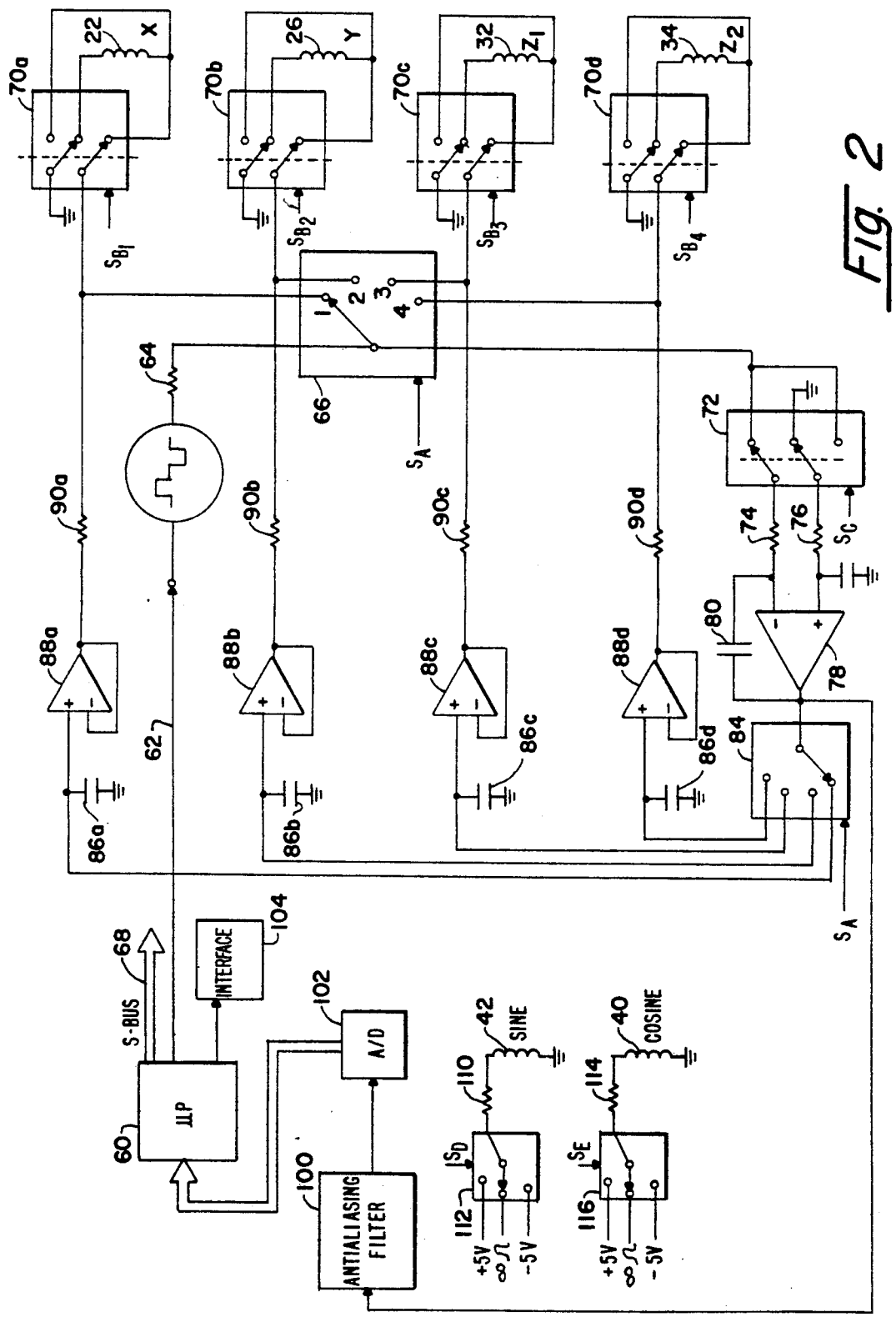
FIG. 2 is a partial schematic and partial block diagram of the circuitry utilized in the instrument of FIG. 1.

The essential components provided by the circuit board 50 are shown in FIG. 2. The circuit board 50 includes a microprocessor 60 used to provide the necessary control signals, the excitation signals to coils 40 and 42, and the excitation signals to and process the information signals obtained from the X, Y, $Z_1$ and $Z_2$ sensors 20, 26, 32 and 34.

The microprocessor has an AC drive line 62 for providing a square wave signal which varies from a positive DC voltage, a high impedance state, a negative DC voltage back to a high imedance state with each AC cycle. The frequency can vary depending on the application, but a typical frequency of the signal is 50 KH. The AC drive line 62 includes the resistor 64, which is connected to the input of a single throw, four pole switch 66. The position of the switch 66 is controlled by the signal $S_A$ provided by the microprocessor 60 through the signal bus 68. The four contacts of the switch 66 are connected to the respective inputs of double throw, double pole switches 70a, 70b, 70c and 70d. The latter are separately controlled by the respective switching signals $S_{B1}$ through $S_{B4}$ supplied by the microprocessor 60 over the signal bus 68. Each of the switches 70 is connected to the respective coils of sensors 22, 26, 32 and 34 so that in one position of the switch, one end of the respective coil is connected to the corresponding contact of the switch 66 and the other end is connected to system ground, and in the other position of the switch the coil is reverse connected with respect to the corresponding contact and system ground. As will be more apparent hereinafter, the coils are energized with an AC signal in which the current flows first in one direction of the coil, and then in the opposite direction so that readings can be taken during both periods of the AC cycle. The two readings are added to one another so as to subtract any offset values attributed to the excitation field due to the AC current, and changes or variations due to temperature, aging of system components, mismatch of component values, and the like.

The output of the coil of each sensor 20, 26, 32 and 34 is provided though the switch 66 to the contacts of a double pole, double throw switch 72, which for reasons which will be evident hereinafter, operates as a synchronous detector so that all of the signals provided at the output of the switch during a particular reading of a coil output are of the same polarity relative to system ground. The opposite contacts of switch are coupled through the input resistors 74 and 76 to the respective inverting and noninverting inputs of a signal detector in the form of an operational amplifier 78. The detector is preferably a differential integrator, wherein the inverting input of amplifier 78 is connected through capacitor 80 to its output, while the noninverting input is connected through capacitor 82 to system ground. The position of switch 72 is controlled by the switching signal $S_c$ provided over the signal bus 68 so that one position of the switch is used when the signal across the coil connected through switch 66 is a positive signal relative to system ground, and the other position is used when the signal across the coil connected through the switch 66 is a negative signal relative to ground so that the resulting signal will be of one polarity. The frequency of the switching signal $S_c$ to the switch 72 is the same frequency as and in phase with the excitation signal provided over line 62. Thus, the output of the operational amplifier 78 will be a rapidly varying DC signal at twice the frequency of the AC drive signal and a function of the average signal provided across the measured coil during the measuring period as determined by the position of switch 66 and rectified by switch 72.

In accordance with one aspect of the present invention, the DC output signal of the amplifier 78 is applied through a feedback path to the coil of the sensor energized so as to drive the sensor coil to null balance, effectively making the coil appear non-magnetic to the other sensor coils after the reading is taken. This is accomplished by maintaining the DC output signal on the coil so as to cancel any magnetic field interference. Any magnetic interference which is otherwise created by the presence of the other core elements of the sensors is therefore substantially cancelled. More specifically, the output of the amplifier 78 of the detector is applied to the input of a single pole, four pole switch 84. The four contacts of the switch 84 are connected to the respective noninverting inputs of the sample and hold buffer amplifiers 88, wherein the noninverting inputs are each connected through a corresponding capacitor 88 to system ground so as to remove the ripple in the DC signal and to hold the DC signal when the switch 84 disconnects the output of amplifier 78 from the input of the corresponding amplifier 88. The inverting inputs of amplifiers 88 are each connected to the corresponding outputs of the amplifiers. The outputs of the buffer amplifiers 88 are connected through resistors 90 to the respective coils by connecting the outputs of the amplifiers to the corresponding lines between each of the contacts of switch 66 and the inputs of the switches 70. The signal $S_A$ provided over bus 68 to control switch 66 is the same signal used to control switch 84 so that the DC feedback signal is applied to the same coil connected to the input of the amplifier 78.

As will be more apparent hereinafter, the output signal of the amplifier 78 also contains information relating to the field component detected by the energized coil. Accordingly, the output of the amplifier is also applied to an anti-aliasing filter 100. The output of the latter is in turn applied to the input of an analog-to-digital (A/D) converter 102, which in turn applies its output to the input of the microprocessor 60. The A/D converter 102 is of a standard type and provides an output of sufficient resolution depending upon the particular application to which the instrument is used. In general, a 16 bit A/D converter can be used, although it should be evident that other sized converters can be used. The latter processes the data and provides an output to the interface 104. The latter can be, for an example, an RS232 interface device useful for transmitting the output signal from the microprocessor to a remote location. The interface can also receive signals from the remote site, e.g., an initiation signal to commence the operation of the microprocessor.

In accordance with another aspect of the present invention, pitch and roll information is acquired by energizing the sine and cosine coils 42 and 40 and reading the induced field components with the X and Y sensors. As shown in FIG. 2, the sine coil 42 is connected in series with resistor 110, with the coil 42 and resistor 110 connected to the input of the single throw, three pole switch 112. The latter has its contacts respectively connected to a positive DC voltage, a source of infinite impedance and a negative DC voltage. The position of the contact of the switch is determined by the switching signal $S_D$ provided over the signal bus 68. When the switch connects the coil 42 to the positive DC voltage, a DC current flows though the coil in one direction, and the sine coil generates a field in one direction through the plane of the coil. When the switch connects the coil 42 to the negative DC voltage, a DC current flows through the coil in the opposite direction and the sine coil generates a field in the opposite direction through the plane of the coil. When the switch connects the coil to the source of infinite impedance so the loop of the coil is open, the sine coil will be prevented from generating incidental fields. As will be more evident hereinafter, the fields created by the sine coil are sensed by the X and Y sensors and used to determine pitch and roll.

In a similar manner the cosine coil 40 is connected to a resistor 114 and to the single throw, three pole switch 116, which in turn is connected to a positive DC voltage, a source of infinite impedance and a negative DC voltage so that a field can be generated in each direction through the plane of the cosine coil 40.

Both positions of switches 112 and 116 are respectively controlled by the switching signals $S_D$ and $S_E$, each provided by the microprocessor 60 over the signal bus 68.

Figure 3:
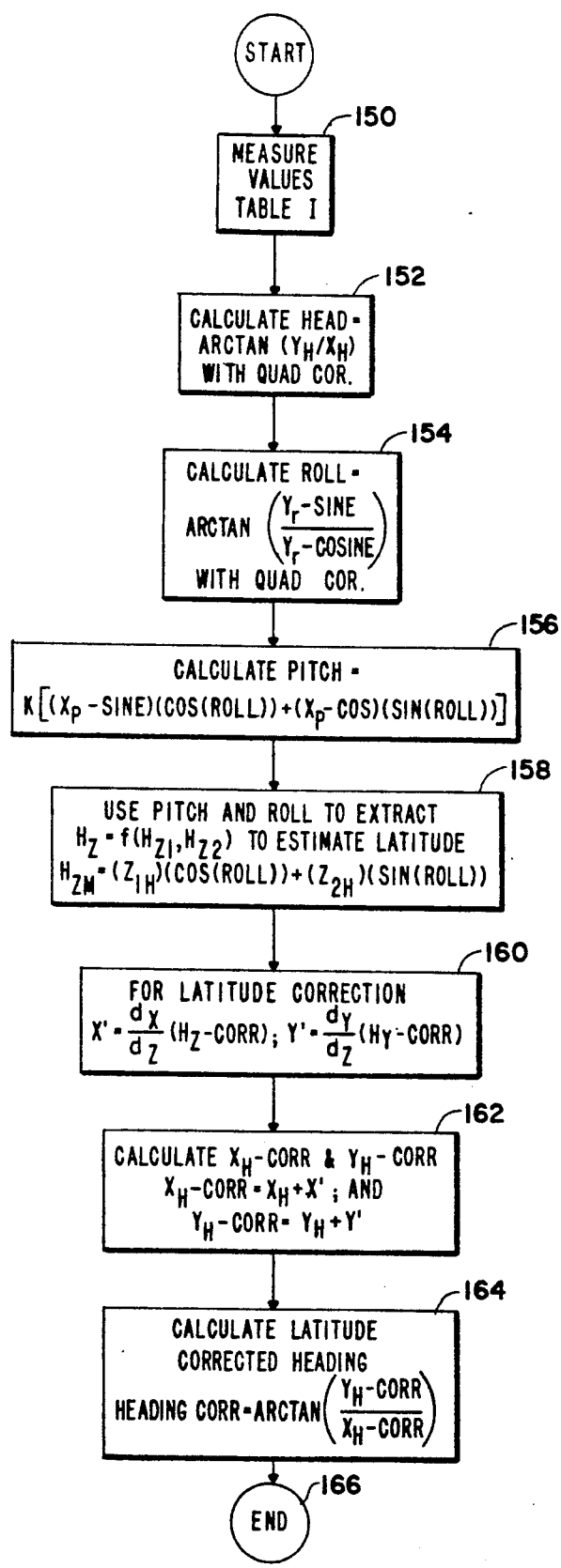
FIG. 3 is a flow chart of the operation of the circuitry shown in FIG. 2.

The microprocessor 60 is preprogrammed to perform all of the necessary steps in carrying out the operation of the instrument. The program can be initiated from a remote site through the interface 104. The program is preferably designed to gather information and then process the information to provide accurate readings for heading, pitch and roll. The program is detailed in FIG. 3. As shown in FIG. 3, the first step 148 starts the program in response to the initiation signal received from the remote location. The next step, indicated at 150, is to determined eight values from measurements taken from the X, Y, $Z_1$ and $Z_2$ sensors, which values then are used to compute heading, pitch and roll. The preferred steps in acquiring data are performed by the steps outlined in the following TABLE I:

TABLE I

| STEP | XCOIL | | YCOIL | | ZCOIL | | | | SINECOIL | | COSCOIL | |
|------|---|---|---|---|----|----|----|----|---|---|---|---|
|      | X | X | Y | Y | Z1 | Z1 | Z2 | Z2 | P | P | R | R |
| HEADING READS |||||||||||||
| 1.  | X |   |   |   |   |   |   |   |   |   |   |   |
| 2.  |   | X |   |   |   |   |   |   |   |   |   |   |
| 3.  |   |   | X |   |   |   |   |   |   |   |   |   |
| 4.  |   |   |   | X |   |   |   |   |   |   |   |   |
| 5.  |   |   |   |   | X |   |   |   |   |   |   |   |
| 6.  |   |   |   |   |   | X |   |   |   |   |   |   |
| 7.  |   |   |   |   |   |   | X |   |   |   |   |   |
| 8.  |   |   |   |   |   |   |   | X |   |   |   |   |
| SINECOIL READS |||||||||||||
| 9.  | X |   |   |   |   |   |   |   | X |   |   |   |
| 10. | X |   |   |   |   |   |   |   |   | X |   |   |
| 11. |   |   | X |   |   |   |   |   | X |   |   |   |
| 12. |   |   | X |   |   |   |   |   |   | X |   |   |
| COSCOIL READS |||||||||||||
| 13. | X |   |   |   |   |   |   |   |   |   | X |   |
| 14. | X |   |   |   |   |   |   |   |   |   |   | X |
| 15. |   |   | X |   |   |   |   |   |   |   | X |   |
| 16. |   |   | X |   |   |   |   |   |   |   |   | X | wherein the X's shown in each step indicate which coils are provided with an AC drive current, and in the case of the X, Y, $Z_1$ and $Z_2$ sensor coils, when energized also have the resulting voltage across the coil read by the detector, i.e., the amplifier 78.

Thus, at step 1, switch 66 connects the AC drive line 62 to the X coil, while switch 70a connects the coil so that current flows through the coil in a predetermined direction considered positive (and thus the X in step one is provided in the X column). The voltage will vary across the coil as a function of the generated field and the earth's field component $H_x$. Since the excitation current applied is an AC signal, the detected DC voltage signal will also vary as an AC signal. The detected signal is syncronously detected by the switch 72 by the application of the switching signal $S_C$. The detected voltage signal is applied to the differential integrator provided by the amplifier 78, which in turn provides a rapidly varying DC output signal provided from the switch 72 (at twice the frequency as the AC drive signal, which as indicated above is preferably at a frequency in the order of 50 KHz). This DC signal is sampled by the capacitor 88a and fed back to the X coil through the sample and hold buffer amplifier 86a and resistor 88a to the X coil so as to drive the coil to null balance. When switch 84 is opened the DC null balance feed back current provided from the signal held by capacitor 86a will cancel any interference introduced by the presence of the X sensor during subsequent operation of the Y, $Z_1$ and $Z_2$ sensors. In addition the signal output from the integrator 78 is applied to the input of anti-aliasing filter 110, which in turns filters the signal before applying the signal to the A/D converter 102. The converter converts the signal to a digital signal and is stored in memory in the microprocessor 60.

In step 2 the procedure of step 1 is repeated except that the position of switch 70a is reversed so that the excitation current is applied in a reverse direction through the X coil (and hence step 2 is indicated as an X under the X column so as to indicate that the X coil is energized in a negative direction), and the voltage across the X coil is measured. The data acquired during step 2 is added to the data acquired during step 1 so that offsets associated with the excitation field through the X-coil and those changes and variations due to temperature, aging of the system components, mismatch of component values, and the like are eliminated, as suggested in U.S. Pat. No. 4,503,621. The result is a signal data, $X_H$, representative of the earth's magnetic field component $H_x$.

In steps 3-8 the procedure of steps 1 and 2 are repeated for the Y, $Z_1$ and $Z_2$ sensors using the switches 66, 70b, 70c and 70d to direct the AC drive current to the appropriate coil in each direction, and the switches 70b, 70c, 70d and 72 to read the voltage outputs from each of the coils.

Following step 8, the resulting X sensor coil reading $X_H$ stored in the microprocessor 60 is representative of the field component $H_x$ sensed by the X sensor coil, the resulting Y sensor coil reading $Y_H$ stored is representative of the field component $H_y$. The resulting $Z_1$ and $Z_2$ sensor coil readings $Z_{1H}$ and $Z_{2H}$ represent the sensed field components $H_z$ which is used to estimate latitude as described in greater detail hereinafter.

In steps 9-16 of TABLE I, information is obtained for calculating pitch and roll. During steps 9-12 the sine coil readings are made. Specifically, during step 9, microprocessor 60 provides a change in the switching signal $S_D$ to the switch 112 so that the sine coil 42 is connected from the infinite impedance to the positive DC voltage source. A current flows in one direction through the sine coil 42 creating a field through the sine coil in the plane of the coil. At the same time the X coil is energized in a positive direction by providing the AC drive current over line 62 through switches 66 and 70a to the X sensor coil. The voltage output of the X sensor coil is read through the switches 66, 70a and 72 as previously described so as to provide a positive signal, $X_{p1}$.

In step 10, the reading is the same as step 9, except that the current is reversed through the sine coil by connecting the sine coil to the negative DC voltage source through switch 112. The voltage output of the X coil is again read so as to provide a negative signal $-X_{p1}$. The latter signal is added to the positive signal $X_{p1}$ so as to provide the $X_{p-sine}$ signal free of any offset values. The value of $X_{p-sine}$, which is the X-component of the pitch angle, is stored in memory in the microprocessor.

In steps 11 and 12 the procedure is repeated, except that the measurements are made with the Y coil so as to produce the $Y_{r1}$ and $-Y_{r1}$ signals. The latter signal is added to the former signal to provide the $Y_{r-sine}$ signal, which is the Y component of the roll angle and is also stored in memory in the microprocessor.

In a similar fashion, the steps 13-16 repeat the steps 9-12 for providing the signals $X_{r1}$, $-X_{r1}$, $Y_{p1}$ and $-Y_{p1}$, except that the cosine coil is energized with positive and negative currents provided through the switch 116 and the flux is sensed by the X and Y coils. The resulting signal produced by adding the signal produced during step 14 to the signal produced during step 13 is $X_{p-cos}$. The resulting signal produced by adding the signal produced during the step 16 to the signal produced during the step 15 is $Y_{r-cos}$.

Accordingly, the eight values determined during step 150 of FIG. 3, $X_H$, $Y_H$, $Z_{1H}$, $Z_{2H}$, $X_{p-sine}$, $Y_{r-sine}$, $X_{p-cos}$ and $Y_{r-cos}$ are all stored in the memory of microprocessor.

The microprocessor proceeds to step 152 of FIG. 3 and calculates the heading in accordance with the following equation:

$$\text{HEADING} = \arctan(Y_H/X_H) \quad (2)$$

using the values of $Y_H$ and $X_H$ obtained during the previous step 150. Based on the polarity of the two values of $Y_H$ and $X_H$, quadrant correction can be provided.

In step 154, the roll angle, ROLL, is determined by the following equation:

$$\text{ROLL} = \arctan(Y_{r-sine}/Y_{r-cos}), \quad (3)$$

using the values of $Y_{r-sine}$ and $Y_{r-cos}$ obtained during step 150. Again quadrant correction is provided based on the polarity of the two values of $Y_{r-sine}$ and $Y_{r-cos}$.

In step 156, the pitch angle, PITCH, is determined by the following equation:

$$\text{PITCH} = K[(X_{p-sine})(\cos(\text{ROLL})) + (X_{p-cos})(\sin(-\text{ROLL}))] \quad (4)$$

using the values of $X_{p-sine}$ and $X_{p-cos}$ obtained during step 150; K being a constant.

In step 158, the values of ROLL and PITCH are used to extract $H_z$ which is a function of $H_{z1}$ and $H_{z2}$ to estimate the latitude. Specifically, the value of $H_{zm}$, the vertical magnetic field component, is determined as follows:

$$H_{zm} = (Z_{1H})(\cos(\text{ROLL})) + (Z_{2H})(\sin(\text{ROLL})) \quad (5)$$

Once the value of $H_{zm}$ is determined by the microprocessor, the correction term, $H_{z-corr}$, based upon latitude, is then determined as follows:

$$H_{z-corr} = [H_{zm} - (\sin(\text{PITCH}))(X_H)/(\sin(\text{PITCH})] \quad (6)$$

Having determine the correction term $H_{z-corr}$, the heading reading acquired at step 152 in accordance with equation (2) can be corrected for latitude.

More specifically, in step 160, the correction to the $H_x$ and $H_y$ field components are determined by the following equations:

$$X' = (dx/dz)(H_{z-corr}); \text{ and} \quad (7)$$

$$Y' = (dy/dz)(H_{z-corr}). \quad (8)$$

wherein dx/dz is the differential change in the $X_H$ field component relative to the $H_{zm}$ term, while dy/dz is the differential change in the $H_y$ relative to the $H_{zm}$ term.

Once the latitude terms are determined, at step 162 the correction is made to the values of $X_H$ and $Y_H$ as follows:

$$X_{H-corr} = X_H + X'; \text{ and} \quad (9)$$

$$Y_{H-corr} = Y_H + Y'. \quad (10)$$

The corrected heading is then provided at step 164 as follows:

$$\text{HEADING}_{corr} = \arctan(Y_{H\text{-}corr}/X_{H\text{-}corr}) \quad (11)$$

The program is thus completed at step 166. The foregoing provides an improved 3-axis magnetometer instrument which provides more accurate heading information compensating for both latitude and attitude errors. By using the sine and cosine coils 40 and 42 the instrument is adapted to provide pitch and roll information for 360° of pitch and roll independent of any mechanical movement, such as motion associated with gimbal bearings, and the inherent problem of stiction. The DC feedback provided to the sensor coils compensates for the magnetic cross coupling created by the sensor elements.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An apparatus for measuring the magnetic heading of the earth's magnetic field, said apparatus comprising: a plurality of fluxgate sensors for respectively measuring components of the earth's magnetic field, said sensors being disposed relative to one another so that as each sensor is operated to measure the corresponding component of the earth's magnetic field the other of said sensors tend to create a magnetic dipole which interferes with said operating sensor; and means for substantially cancelling any magnetic cross coupling between said operating sensor and the remaining of said sensors due to said magnetic dipoles.

2. An apparatus according to claim 1, further including means for generating an AC signal for energizing each of said sensors so that each said sensor operates to measure the corresponding component of the earth's magnetic field, and means for detecting a signal from said sensor as a function of the magnetic field component sensed by said sensor, wherein said means for substantially cancelling any magnetic cross coupling includes means for generating and maintaining a continuous DC feedback signal to said sensor as a function of the signal from said sensor.

3. An apparatus according to claim 2, further including means for applying said AC signal to said sensors in a sequential manner and said DC feedback signal to said sensors in a continuous manner.

4. An apparatus according to claim 2, wherein each of said sensors includes a coil disposed around a core element of magnetic saturable material.

5. An apparatus according to claim 4, further including means for applying said AC signal to each of said sensors in one direction of said coil and subsequently in the opposite direction of said coil.

6. An apparatus according to claim 5, further including means for applying said AC signal in said one direction of each of said coils and in the opposite direction of said coils in a sequential manner.

7. An apparatus according to claim 2, further including support means for gimbally supporting at least two of said sensors so that said gimbally supported sensors are positioned to sense the horizontal field components of the earth's magnetic field.

8. An apparatus according to claim 7, further including a casing for receiving said sensors and means for fixing at least two of said sensors relative to said casing so that said two sensors sense the field component of the earth's magnetic field radial to the case.

9. An apparatus for measuring the magnetic heading of the earth's magnetic field, said apparatus comprising:
a casing;
a plurality of fluxgate sensors for respectively measuring components of the earth's magnetic field;
gimbal support means, disposed within said casing, for pivotally supporting at least two of said fluxgate sensors about two mutually perpendicular axes; and
means, fixed relative to said casing, for determining the pitch and roll angles of said casing relative to the earth's magnetic field and including at least two coils fixed to said casing, each of said coils being disposed in a plane and oriented so that the plane of the coils are mutually orthogonal to one another, means for generating a magnetic field through each of said coils, wherein said gimbaled fluxgate sensors sense the magnetic field components of said generated magnetic fields and said sensed magnetic field components are used to determine the pitch and roll angles.

10. An apparatus according to claim 9, wherein said planes of said coils intersect along a line passing through both of said coils.

11. An apparatus according to claim 10, wherein said fluxgate sensors are disposed within said two coils.

12. An apparatus according to claim 11, wherein said means for generating said magnetic field through each of said coils sequentially generates the magnetic field in one direction through the coil and then through the opposite direction, and said two fluxgate sensors sense the magnetic fields in each direction through each of the coils, and magnetic components sensed by each of said two sensors in response to the magnetic fields generated in opposite directions are utilized to cancel offsets.

* * * * *

UNITED STATES PATENT AND TRADEMARK OFFICE
CERTIFICATE OF CORRECTION

PATENT NO. : 5,170,566

DATED : December 15, 1992

INVENTOR(S) : J. Thomas Fowler and George E. Selecman

It is certified that error appears in the above-identified patent and that said Letters Patent is hereby corrected as shown below:

Claim 9, column 12, line 32, delete "plane" (second instance), and substitute therefor --planes--.

Signed and Sealed this

Seventh Day of December, 1993

*Attest:*

BRUCE LEHMAN

*Attesting Officer*     *Commissioner of Patents and Trademarks*